(12) United States Patent
Moufawad Moufawad

(10) Patent No.: US 11,202,408 B2
(45) Date of Patent: Dec. 21, 2021

(54) FRUIT PICKER AND BRANCH TRIMMER

(71) Applicant: Samir Moufawad Moufawad, Mazraat Yashouh (LB)

(72) Inventor: Samir Moufawad Moufawad, Mazraat Yashouh (LB)

(*) Notice: Subject to any disclaimer, the term of this patent is extended or adjusted under 35 U.S.C. 154(b) by 240 days.

(21) Appl. No.: 16/724,220

(22) Filed: Dec. 21, 2019

(65) Prior Publication Data

US 2021/0185924 A1 Jun. 24, 2021

(51) Int. Cl.
*A01D 46/247* (2006.01)
*A01G 3/025* (2006.01)

(52) U.S. Cl.
CPC ........... *A01D 46/247* (2013.01); *A01G 3/025* (2013.01)

(58) Field of Classification Search
CPC ...... A01D 46/247; A01D 46/22; A01D 46/24; A01G 3/02; A01G 3/021; A01G 3/025; A01G 3/0255; A01G 3/08; A01G 3/081; A01G 2003/023
See application file for complete search history.

(56) References Cited

U.S. PATENT DOCUMENTS

| | | | | |
|---|---|---|---|---|
| 55,150 A * | 5/1866 | Newcomb | ............ | A01D 46/247 56/339 |
| 79,906 A * | 7/1868 | Hotchkiss | ............ | A01D 46/247 56/336 |
| 97,973 A * | 12/1869 | Shehan | .................. | A01G 3/025 30/246 |
| 156,512 A * | 11/1874 | Vance | .................... | A01G 3/025 30/246 |
| 256,421 A * | 4/1882 | Williamson et al. | ........................ | A01D 46/247 56/335 |
| 531,358 A * | 12/1894 | Bosley | .................... | A01G 3/025 30/246 |
| 611,065 A * | 9/1898 | Dobbins | ................. | A01G 3/025 30/246 |
| 613,801 A * | 11/1898 | Huff | ........................ | A01G 3/025 30/246 |
| 683,585 A * | 10/1901 | Woods | .................... | A01G 3/025 30/246 |
| 803,953 A * | 11/1905 | Wright | .................... | A01G 3/025 30/246 |
| 845,027 A * | 2/1907 | Bingaman | .............. | A01G 3/025 30/237 |

(Continued)

FOREIGN PATENT DOCUMENTS

| | | | | |
|---|---|---|---|---|
| CH | 101104 A | * | 9/1923 | ........... A01D 46/247 |
| CN | 111631010 A | * | 9/2020 | |

(Continued)

*Primary Examiner* — Adam J Behrens

(57) ABSTRACT

A fruit picker and branch trimmer comprising a frame or partial frame coupled to a stick, and at least one rotating jaw. The jaw is triggered by blades or pins coming in contact with the stem or branch, or by the fruit itself pushing on the jaw. Simply, the jaw rotates by only pulling on the stick. When a jaw rotates, its non-hinged sharp end presses the stem or branch on an obstacle, hence cutting the stem or branch. When two jaws rotate the stem or branch is cut when the sharp edges of the jaws come together. Another type of jaws has at least one elongated recess, when a stem or branch falls into the elongated recess it will be twisted and broken when the jaw rotates.

14 Claims, 3 Drawing Sheets

(56) References Cited

U.S. PATENT DOCUMENTS

| | | | | |
|---|---|---|---|---|
| 857,129 A * | 6/1907 | Watson | ............... | A01G 3/025 30/246 |
| 1,258,455 A * | 3/1918 | Pinkos | ............... | A01G 3/025 30/249 |
| 1,746,073 A * | 2/1930 | Dagley | ............ | A01G 3/0255 30/246 |
| 2,235,564 A * | 3/1941 | Rieff | ............ | A01G 3/0255 30/246 |
| 2,346,986 A * | 4/1944 | Metzger | ........... | A01D 46/247 56/335 |
| 5,253,466 A * | 10/1993 | Chua | ............... | A01D 46/247 56/335 |
| 5,347,800 A * | 9/1994 | Morgan | ........... | A01D 46/247 56/332 |
| 2012/0255271 A1* | 10/2012 | Madani | ............... | A01D 46/22 56/333 |
| 2013/0152404 A1* | 6/2013 | Huang | ............... | B26B 13/26 30/188 |
| 2014/0283495 A1* | 9/2014 | Christensen | ........ | A01D 46/247 56/332 |
| 2017/0118921 A1* | 5/2017 | Lo | ..................... | A01G 3/0255 |

FOREIGN PATENT DOCUMENTS

| | | | | |
|---|---|---|---|---|
| DE | 202004005264 U1 * | 6/2004 | ........... | A01D 46/247 |
| GB | 191311224 A * | 3/1914 | ........... | A01D 46/247 |
| KR | 200362582 Y1 * | 9/2004 | | |
| KR | 20120005338 U * | 7/2012 | | |

* cited by examiner

FRUIT PICKER AND BRANCH TRIMMER

BACKGROUND OF THE INVENTION

Field of the Invention

Embodiments of the invention described herein pertain to the field of fruit harvesting and tree trimming. More particularly, but not by way of limitation, one or more embodiments of the invention enables a fruit pickers and branch trimmers with rotating jaws.

Description of the Related Art

There are fruit pickers which by pulling on them, the fruit falls in a basket. However, in doing so the branch carrying the fruit is also pulled violently causing it to break or causing other fruits on the branch to fall. Also, there are fruit pickers and branch trimmers with scissors used for cutting the stem or branch. The scissors need engaging means, usually a rope. But, as the fruit or branch gets higher, the stick and the rope become longer. Therefore, cutting becomes difficult and impractical. Some fruit pickers have one or more blades but they are not very effective because the blade does not rotate to adjust to the orientation of the stem or branch. Hence, the need for an improvement which involves decreasing the pulling force by transforming the force from the direction along the stem or branch to a direction perpendicular to the stem or branch.

BRIEF SUMMARY OF THE INVENTION

Pulling fruit pickers exert force on the branch carrying the fruit. This might break the branch or cause other fruits on the branch to fall. Stem or branch cutters usually use a pair of scissors which is impractical and difficult to use with high fruits and branches. The present invention incorporates at least one jaw which rotates when the fruit picker or branch trimmer is pulled. The rotation of the jaw transforms the pulling force from the direction along the stem or branch to a direction roughly perpendicular to the stem of branch thus rendering the force more effective in cutting.

The fruit picker or the branch trimmer comprises a frame or partial frame pulled by a stick, and at least one jaw. The jaw is triggered by blades or pins coming in contact with the stem or branch, or by the fruit itself pushing on the jaw. When the jaw rotates, the non-hinged sharp end presses the stem or branch with a perpendicular force on an obstacle causing the stem or branch to be cut. Another type of jaws have elongated recesses, when a stem or branch falls into an elongated recess, it will be broken when the jaw rotates.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

Figure 1:
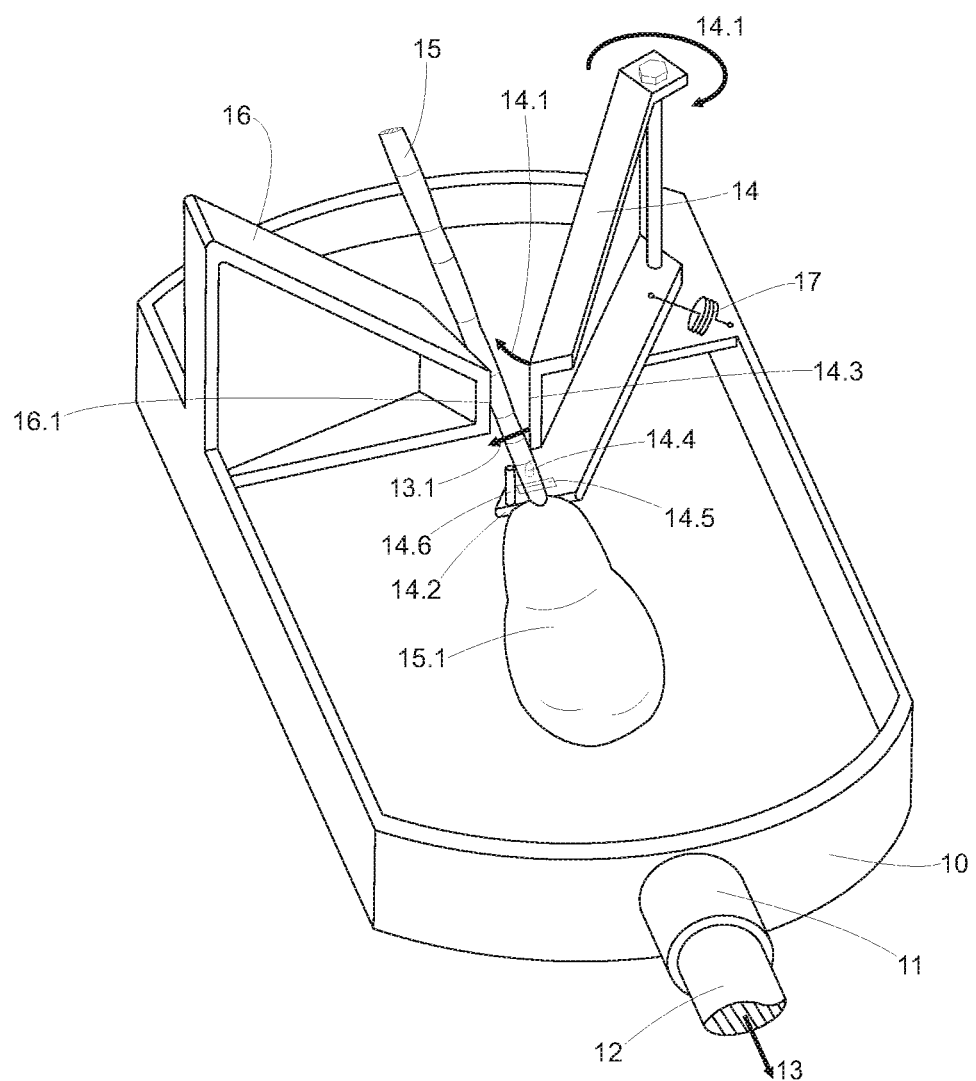
FIG. 1 is a diagram of an exemplary frame with a fixed obstacle and a rotating jaw in accordance with the fruit picker and branch trimmer described herein.

The fruit picker and the branch trimmer will now be described using exemplary embodiments of the invention. It will be apparent to an ordinary skilled in the art person that the present invention may be practiced without incorporating all its aspects herein. Readers should note that although examples of the invention are set forth herein, the claims, and the full scope of any equivalents, are what define the metes and bounds of the inventions FIG. 1 is a diagram of an exemplary frame with a fixed obstacle and a rotating jaw in accordance with the fruit picker and branch trimmer described herein.

Frame 10 is coupled on front to an adaptor 11 which engages a stick 12. An obstacle 16 is fixed on one side of frame 10 toward the rear. The non-fixed end of obstacle 16 has vertical edge 16.1. A jaw 14 is rotationally coupled on the other side of frame 10 toward the rear. The non-hinged end of jaw 14 has vertical edge 14.3. At least one of edge 16.1 and edge 14.3 is sharp. Blades 14.5 and pins 14.4 and pin 14.6 are coupled farther on the non-hinged end of jaw 14. Pin 14.6 is and the edge 14.2 of the farther part of the non-hinged end of jaw 14, face fruit 15.1.

Obstacle 16 and jaw 14 are sloped to guide stem 15 of fruit 15.1 to an in-between position between edge 16.1 and edge 14.3. When stem 15 is in between edge 16.1 and edge 14.3, it latches to blade 14.5 or pin 14.4 or to edge 14.3 given that it is sharp. Or simply pin 14.6 or edge 14.2 will be pushed by fruit 15.1 itself and jaw 14 will rotate clockwise 14.1. So, when stick 12 is pulled by the user with a force 13, force 13 is translated to a force 13.1 roughly perpendicular to stem 15. As jaw 14 rotates, edge 14.3 pushes stem 15 against edge 16.1. As a result, stem 15 is cut.

After stem 15 is cut, jaw 14 returns to its original position by the attraction of the gravitational force. To ensure the return of jaw 14, a spring 17 can be added between jaw 14 and frame 10.

Figure 1B:
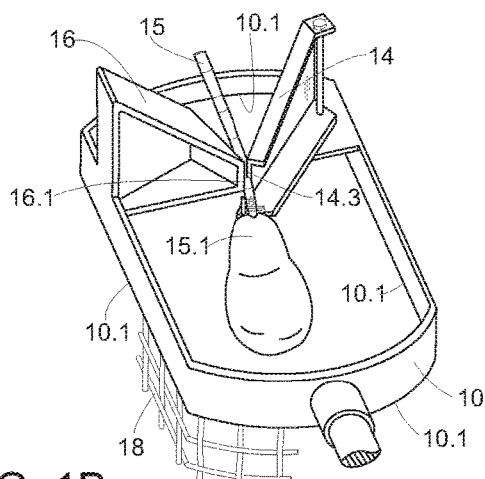
FIG. 1b illustrates an exemplary non-hinged sharp end of the rotating jaw cutting the stem of a fruit in accordance with the fruit picker and branch trimmer described herein.

FIG. 1b illustrates an exemplary non-hinged sharp end of the rotating jaw cutting the stem of a fruit in accordance with the fruit picker and branch trimmer described herein.

When edge 14.3 of jaw 14 presses on edge 16.1 of obstacle 16, stem 15 is cut. Then fruit 15.1 will fall into basket 18 which is preferably attached on the bottom 10.1 of frame 10. Basket 18 can generally take the shape of frame 10 but it can be any shape and length.

Figure 2:
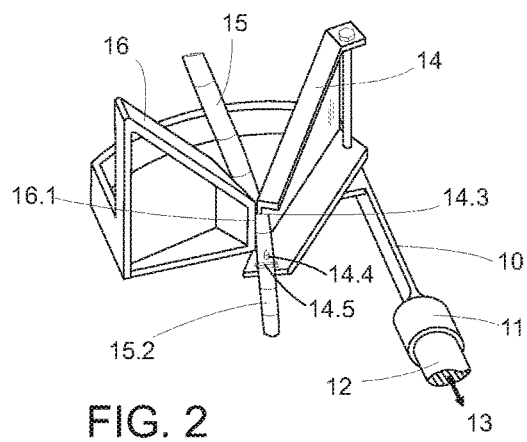
FIG. 2 illustrates an exemplary partial frame with a fixed obstacle and a rotating jaw cutting a branch in accordance with the fruit picker and branch trimmer described herein.

FIG. 2 illustrates an exemplary partial frame with a fixed obstacle and a rotating jaw cutting a branch in accordance with the fruit picker and branch trimmer described herein.

This configuration is similar to configuration of FIG. 1 except that the frame is partial and there is no basket. Therefore it can be used to cut branches such as branch 15.2 or fruits which don't need to be collected in a basket. With branches, latching can occur only with pin 14.4 or blade 14.5 or edge 14.3.

Figure 3:
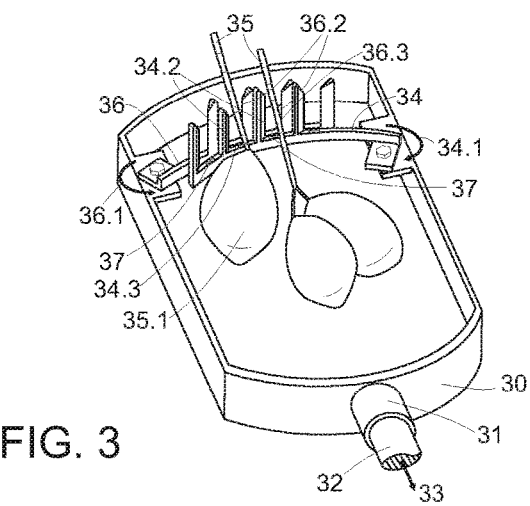
FIG. 3 is a diagram of an exemplary frame with two oppositely rotating jaws in accordance with the fruit picker and branch trimmer described herein.

FIG. 3 is a diagram of an exemplary frame with two oppositely rotating jaws in accordance with the fruit picker and branch trimmer described herein.

Figure 3B:
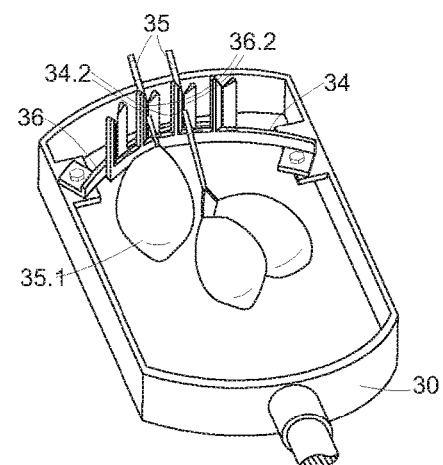
FIG. 3b illustrates an exemplary frame with two oppositely rotating jaws cutting the stem in accordance with the fruit picker and branch trimmer described herein.

Frame 30 is coupled on front to an adaptor 31 which engages a stick 32. Jaws 34 and 36 are rotationally coupled on opposite sides of frame 30 toward the rear. Jaws 34 and 36 have recesses 34.3 and 36.3 with sharp edges 34.2 and 36.2. When stems 35 are in recesses 34.3 and 36.3, one or more stems latches to blades 37 or edges 34.2. Or jaw 34 is pushed by fruit 35.1 itself. When stick 32 is pulled by force 33, jaw 34 will rotate clockwise 34.1 which cause jaw 36 to rotate counterclockwise 36.1. The rotation of both jaws 34 and 36 causes sharp edges 34.2 and 36.2 to come together and press on stems 35 and eventually cut stems 35 as shown in FIG. 3b.

Figure 4:
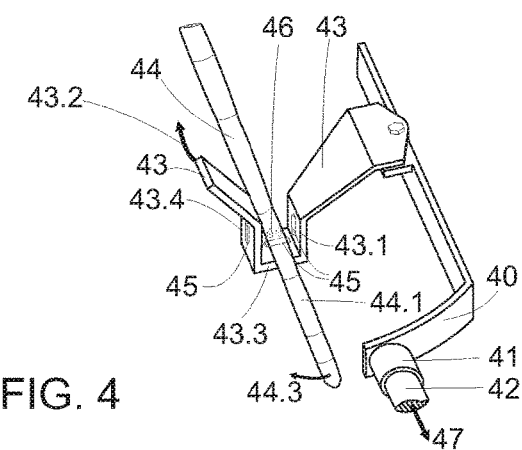
FIG. 4 is a diagram of an exemplary rotating sloped shape jaw with an elongated recess in accordance with the fruit picker and branch trimmer described herein.

FIG. 4 is a diagram of an exemplary rotating sloped shape jaw with an elongated recess in accordance with the fruit picker and branch trimmer described herein.

Partial frame 40 is coupled on front to an adaptor 41 which engages a stick 42. Jaw 43 is rotationally coupled to partial frame 40. The sloped or V shape jaw 43 guide branch 44 to a position into an elongated recess 43.3. Blades 45 and pins 46 are coupled inside the elongated recess 43.3. When branch 44 slides into the elongated recess 43.3, it latches to blades 45 or pins 46. So, when stick 41 is pulled by the user with a force 47, jaw 43 rotates clockwise 43.2.

Figure 4B:
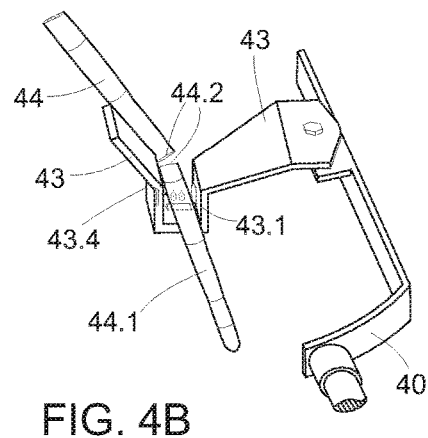
FIG. 4b illustrates an exemplary rotating sloped shape jaw with an elongated recess breaking a branch in accordance with the fruit picker and branch trimmer described herein.

When jaw 43 rotates, side 43.4 comes in contact with the upper portion of branch 44, and side 43.1 comes in contact with the branch lower portion 44.1. Since the upper portion of branch 44 is attached to a tree, the lower portion 44.1 is twisted and will rotate clockwise 44.3 and branch 44 will break 44.2 at side 43.4 as shown in FIG. 4b.

Figure 5:
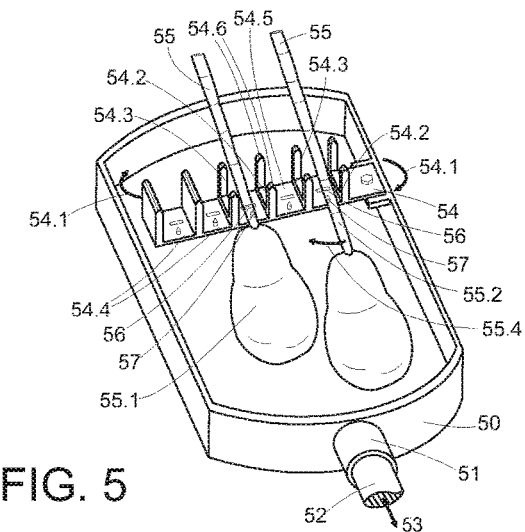
FIG. 5 is a diagram of an exemplary rotating jaw with many elongated recesses in accordance with the fruit picker and branch trimmer described herein.

FIG. 5 is a diagram of an exemplary rotating jaw with many elongated recesses in accordance with the fruit picker and branch trimmer described herein.

Frame 50 is coupled on front to an adaptor 51 which engages a stick 52. A jaw 54 with elongated recesses 54.4 is rotationally coupled on one side of frame 50 toward the rear. The elongated recesses 54.4 are continuous while the elongated recesses 54.5 are formed of pins 54.6.

Blades 56 or pins 57 latch to stems 55. Or jaw 54 is pushed by the fruit 55.1 itself and jaw 54 will rotate clockwise 54.1.

Figure 5B:
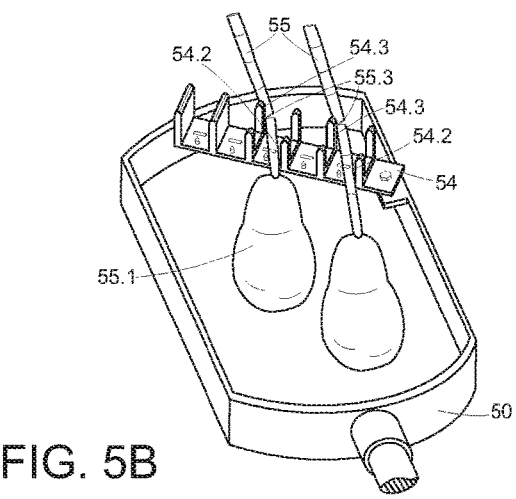
FIG. 5b illustrates an exemplary rotating jaw with many elongated recesses cutting the stem in accordance with the fruit picker and branch trimmer described herein.

When jaw 54 rotates, side 54.3 comes in contact with the upper portion of stem 55, and side 54.2 comes in contact with the stem lower portion of 55.2. Since the upper portion of stem 55 is attached to a tree, the lower portion 55.2 is twisted and will rotate clockwise 55.4 and stem 55 will break 55.3 at side 54.3 as shown in FIG. 5b.

Figure 6:
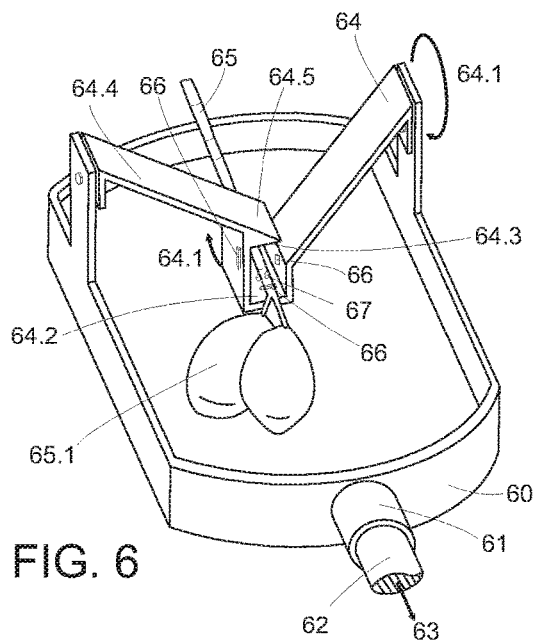
FIG. 6 is a diagram of an exemplary rotating sloped shape jaw with an elongated recess with top obstacle in accordance with the fruit picker and branch trimmer described herein.

FIG. 6 is a diagram of an exemplary rotating sloped shape jaw with an elongated recess with a top obstacle in accordance with the fruit picker and branch trimmer described herein.

Frame 60 is coupled on front to an adaptor 61 which engages a stick 62. A sloped shape jaw 64 is rotationally coupled to both sides of frame 60. Sloped shape jaw 64 has on the bottom an elongated recess 64.2. On recess 64.2, blades 66 and pins 67 are coupled. One side 64.4 of the sloped shape jaw 64 is extended to form top obstacle 64.5 for the recess 64.2, so that stem 65 slides underneath top obstacle 64.5 but cannot get out when jaw 64 rotates.

Figure 6B:
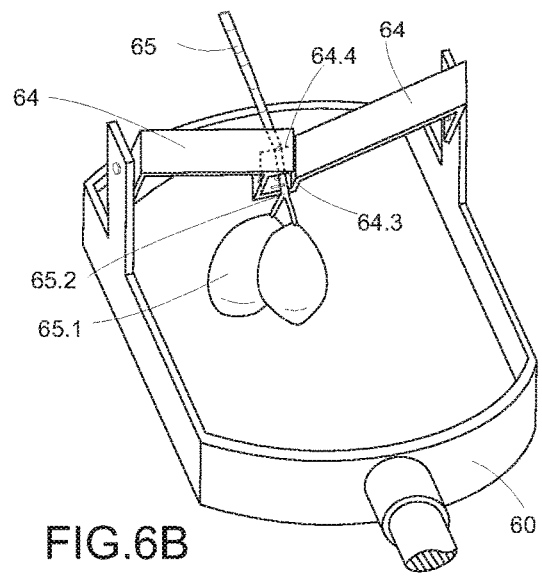
FIG. 6b illustrates an exemplary rotating sloped shape jaw with an elongated recess and a top obstacle breaking a branch in accordance with the fruit picker and branch trimmer described herein.

When stem 65 slides into the recess 64.2, it latches to blades 66 or pins 67, or it gets pushes by the fruit 65.1. So, when the user pulls on the stick 62 by a force 63, jaw 64 rotates and stem 65 comes in contact with top obstacle 64.5 at the front side 64.3 of top obstacle 64.5, and the rear side 64.4 of the recess 64.2. Since the upper portion of stem 65 is attached to a tree, the lower portion 65.2 is twisted and will rotate with jaw 64 until it breaks at the rear edge 64.4 of recess 64.2 as shown in FIG. 6b.

Figure 7:
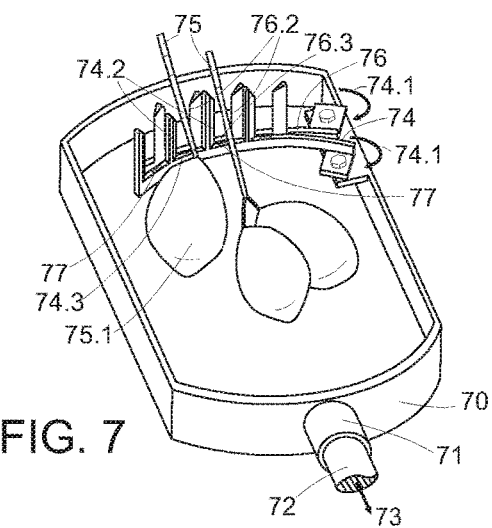
FIG. 7 is a diagram of an exemplary frame with two rotating jaws in accordance with the fruit picker and branch trimmer described herein.

FIG. 7 is a diagram of an exemplary frame with two rotating jaws in accordance with the fruit picker and branch trimmer described herein.

Figure 7B:
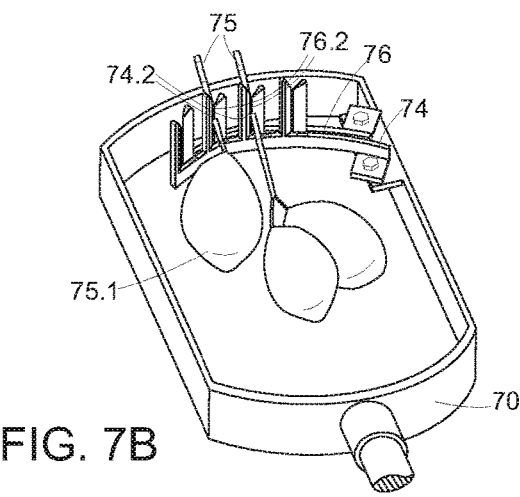
FIG. 7b illustrates an exemplary frame with rotating jaws cutting the stem in accordance with the fruit picker and branch trimmer described herein.

This configuration is similar to configuration of FIG. 3 except that Jaws 74 and 76 are rotationally coupled on the same side of frame 70 toward the rear. When stems 75 are in recesses 74.3 and 76.3, one or more stems latches to blades 77 or edges 74.2. Or jaw 74 is pushed by fruit 75.1. When stick 72 is pulled by force 73, jaws 74 and 76 will rotate clockwise 74.1. The rotation of both jaws 74 and 76 causes sharp edges 74.2 and 76.2 to come together and press on stems 75 and eventually cut stems 75 as shown in FIG. 7b.

What is claimed is:

1. A fruit picker and branch trimmer including:
   a frame or a partial frame;
   an adaptor coupled to a front side of said frame or said partial frame, wherein said adaptor engages a stick;
   at least one jaw rotationally coupled to one side of said frame or said partial frame, wherein a non-hinged end of said jaw has at least one edge; and
   at least one obstacle coupled to the opposite side of said frame or said partial frame, wherein said jaw meets said obstacle when said jaw rotates, wherein at least one of said edge and said obstacle is sharp,
   wherein said jaw comprises at least one latching mechanism including blades and pins, said latching mechanism configured to latch at least one branch or stem and to cause rotation of said jaw when a pulling force is applied to said stick,
   wherein said at least one stem or branch is pressed between said edge and said obstacle when said jaw rotates.

2. A fruit picker and branch trimmer including:
   a frame or a partial frame,
   an adaptor coupled to a front side of said frame or said partial frame, wherein said adaptor engages a stick;
   at least one set of two jaws wherein said jaws are rotationally coupled to opposite sides of said frame or said partial frame, or said jaws are rotationally coupled to a same side of said frame or said partial frame, wherein each of said jaws has at least one recess with at least one sharp edge, wherein at least one of said two jaws comprises at least one latching mechanism including blades and pins, said latching mechanism configured to latch at least one branch or stem and to cause rotation of said jaws when a pulling force is applied to said stick, wherein said at least one stem or branch is pressed between said sharp edges of said recesses when said jaws rotate.

3. A fruit picker and branch trimmer including:

a frame or partial frame;

an adaptor coupled to a front side of said frame or said partial frame, wherein said adaptor engages a stick;

at least one jaw rotationally coupled to at least one side of said frame or said partial frame, wherein said jaw has at least one elongated recess, wherein said jaw comprises at least one latching mechanism including blades and pins, said latching mechanism configured to latch at least one branch or stem and to cause rotation of said jaw when a pulling force is applied to said sticks, wherein said at least one stem or branch is twisted in said elongated recess when said jaw rotates.

4. The fruit picker and branch trimmer of claim 1, further comprising a basket coupled to said frame or said partial frame.

5. The fruit picker and branch trimmer of claim 2, further comprising a basket coupled to said frame or said partial frame.

6. The fruit picker and branch trimmer of claim 3, further comprising a basket coupled to said frame or said partial frame.

7. The fruit picker and branch trimmer of claim 1, further comprising at least one spring coupled to said jaw and said frame or said partial frame.

8. The fruit picker and branch trimmer of claim 2, further comprising at least one spring coupled to at least one said jaw and said frame or said partial frame.

9. The fruit picker and branch trimmer of claim 3, further comprising at least one spring coupled to said jaw and said frame or said partial frame.

10. The fruit picker and branch trimmer of claim 1, wherein at least one of said jaw and said obstacle is sloped.

11. The fruit picker and branch trimmer of claim 3, wherein at least one said jaw is sloped.

12. The fruit picker and branch trimmer of claim 3, further comprising at least one obstacle coupled to a top of at least one said elongated recess.

13. The fruit picker and branch trimmer of claim 3, wherein said elongated recess is continuous or formed of pins.

14. The fruit picker and branch trimmer of claim 13, further comprising at least one spring coupled to said jaw and said frame or said partial frame.

* * * * *